United States Patent
Yoo et al.

(10) Patent No.: US 9,910,307 B2
(45) Date of Patent: Mar. 6, 2018

(54) DISPLAY DEVICE

(71) Applicant: Samsung Display Co., Ltd., Yongin-Si, Gyeonggi-Do (KR)

(72) Inventors: Jaesuk Yoo, Seoul (KR); Jungki Kim, Hwaseong-si (KR); Kyoungho Park, Seoul (KR); Kisoo Park, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/334,687

(22) Filed: Oct. 26, 2016

(65) Prior Publication Data

US 2017/0255050 A1 Sep. 7, 2017

(30) Foreign Application Priority Data

Mar. 7, 2016 (KR) .................. 10-2016-0027272

(51) Int. Cl.
*G02F 1/1333* (2006.01)
*H05K 7/00* (2006.01)

(52) U.S. Cl.
CPC .................. *G02F 1/133308* (2013.01); *G02F 2001/133317* (2013.01); *G02F 2201/46* (2013.01); *G02F 2202/28* (2013.01)

(58) Field of Classification Search
CPC .................................................. G02F 2001/13

USPC ...................................................... 361/679.21
See application file for complete search history.

(56) References Cited

U.S. PATENT DOCUMENTS

| | | | |
|---|---|---|---|
| 6,667,780 B2 * | 12/2003 | Cho | .................. G02B 6/0086 349/58 |
| 2009/0237586 A1 * | 9/2009 | Han | .................. G02F 1/133308 349/58 |

FOREIGN PATENT DOCUMENTS

| | | |
|---|---|---|
| KR | 101152545 B1 | 5/2012 |
| KR | 101300020 B1 | 8/2013 |
| KR | 1020130142624 A | 12/2013 |
| KR | 101351350 B1 | 1/2014 |
| KR | 101380850 B1 | 3/2014 |
| KR | 1020140083878 A | 7/2014 |
| KR | 101432049 B1 | 8/2014 |

* cited by examiner

*Primary Examiner* — Jerry Wu
(74) *Attorney, Agent, or Firm* — Cantor Colburn LLP

(57) ABSTRACT

A display device includes a display panel including a display area and a non-display area surrounding the display area, a middle frame which is disposed under the display panel and supports the non-display area, and a coupling unit disposed between the display panel and the middle frame where the coupling unit includes a first coupling member including a reference coupling part extending a predetermined direction and a plurality of branch coupling parts protruded from the reference coupling part and a second coupling member disposed between two branch coupling parts adjacent to each other among the branch coupling parts.

23 Claims, 14 Drawing Sheets

DISPLAY DEVICE

This application claims priority to Korean Patent Application No. 10-2016-0027272, filed on Mar. 7, 2016, and all the benefits accruing therefrom under 35 U.S.C. § 119, the content of which in its entirety is herein incorporated by reference.

BACKGROUND

1. Field

Exemplary embodiments of the invention relate to a display device. More particularly, exemplary embodiments of the invention relate to a display device having improved reliability.

2. Description of the Related Art

Various types of display devices, which are applied to multimedia devices, such as a television set, a mobile phone, a navigation unit, a computer monitor, a game unit, etc., have been developed. The display devices provide a user with an image having predetermined information. The display devices generally include an area in which the image is displayed and an area in which the image is not displayed when viewed in a front view. As the area of the display devices in which the image is not displayed decreases, the area of the display devices in which the image is displayed increases.

SUMMARY

Exemplary embodiments of the invention provide a display device having improved manufacturing yield and capable of being easily reworked.

Exemplary embodiments of the invention provide a display device including a display panel including a display area and a non-display area surrounding the display area, a middle frame supporting the non-display area, and a coupling unit disposed between an area extending in a predetermined direction of the non-display area and the middle frame to couple the display panel and the middle frame. The coupling unit may include a first coupling member including a reference coupling part extending the predetermined direction and a plurality of branch coupling parts protruded from the reference coupling part and a second coupling member disposed between two branch coupling parts adjacent to each other among the branch coupling parts.

In an exemplary embodiment, the branch coupling parts and the second coupling member may be disposed between the reference coupling part and the display area when viewed in a plan view.

In an exemplary embodiment, the non-display area may include a first non-display area extending along a first direction, a second non-display area facing the first non-display area such that the display area is disposed between the first and second non-display areas, a third non-display area extending along a second direction different from the first direction, and a fourth non-display area facing the third non-display area such that the display area is disposed between the third and fourth non-display areas, and the coupling unit is disposed between the third non-display area and the middle frame.

In an exemplary embodiment, the display device further may include a support unit disposed between at least one of the first, second, and fourth non-display areas and the middle frame.

In an exemplary embodiment, the display device further may include a top chassis covering the fourth non-display area when viewed in a plan view and being coupled to the middle frame.

In an exemplary embodiment, the support unit may include an elastic member disposed between the fourth non-display area and the middle frame.

In an exemplary embodiment, the support unit may include a first adhesive unit disposed between the first non-display area and the middle frame and a second adhesive unit disposed between the second non-display area and the middle frame.

In an exemplary embodiment, the first adhesive unit may include a first adhesive member including a first reference adhesive part extending in the first direction and a plurality of first branch adhesive parts protruded in the second direction from the first reference adhesive part and a second adhesive member disposed between two first branch adhesive parts adjacent to each other among the first branch adhesive parts. The second adhesive unit may include a third adhesive member including a second reference adhesive part extending in the first direction and a plurality of second branch adhesive parts protruded in the second direction from the second reference adhesive part and a fourth adhesive member disposed between two second branch adhesive parts adjacent to each other among the second branch adhesive parts.

In an exemplary embodiment, each of the first and second adhesive units may include substantially a same material as that of one of the first coupling member and the second coupling member, and each of the first and second adhesive units extends along the first direction.

In an exemplary embodiment, the support unit may further include a third adhesive unit disposed between the fourth non-display area and the middle frame.

In an exemplary embodiment, the third adhesive unit may include a first adhesive member including a reference adhesive part extending along the second direction and a plurality of branch adhesive parts protruded in the first direction from the reference adhesive part and a second adhesive part disposed between two branch adhesive parts adjacent to each other among the branch adhesive parts.

In an exemplary embodiment, the third adhesive unit may include substantially a same material as that of one of the first coupling member and the second coupling member, and the third adhesive unit extends along the second direction.

In an exemplary embodiment, the display panel may be curved as viewed relative to a reference axis parallel to the first direction with respect to a plane defined by the first direction and the second direction.

In an exemplary embodiment, the third non-display area may include a first area, a second area, and a third area sequentially arranged in the second direction. The second coupling member may be provided in a plural number and includes outer coupling members attached to the first and third areas and a center coupling member attached to the second area. The branch coupling parts may include outer branch coupling members attached to the first and third areas and a center branch coupling member attached to the second area. A ratio of an area of the outer coupling members to an area of the first and third areas may correspond to a first ratio when viewed in a plan view, and a ratio of an area of the center coupling member to an area of the second area may correspond to a second ratio smaller than the first ratio when viewed in a plan view.

In an exemplary embodiment, each of the outer coupling members may have a first width, the center coupling member has a second width smaller than the first width, and the first and second widths are measured in a direction parallel to the second direction.

In an exemplary embodiment, each of the outer branch coupling members may have a first width, the center branch coupling member may have a second width smaller than the first width, and the first and second widths may be measured in a direction parallel to the second direction.

In an exemplary embodiment, the reference coupling part may be disposed between the display area and the branch coupling parts when viewed in a plan view.

In an exemplary embodiment, the first coupling member may include a first adhesive layer attached to the display panel, a second adhesive layer attached to the middle frame, and a polymer resin layer disposed between the first adhesive layer and the second adhesive layer.

In an exemplary embodiment, the first coupling member may further include a film layer disposed between the second adhesive layer and the polymer resin layer.

In an exemplary embodiment, the second coupling member may be a curable resin.

Exemplary embodiments of the invention provide a display device including a display panel having a curved shape, a middle frame disposed under the display panel and having a curved shape corresponding to the curved shape, a first coupling member including a reference coupling part disposed between the display panel and the middle frame and extending in a predetermined direction and a plurality of branch coupling parts protruded from the reference coupling part to a direction different from the direction in which the reference coupling part extends, and a second coupling member disposed between the display panel and the middle frame and disposed between two branch coupling parts adjacent to each other among the branch coupling parts.

In an exemplary embodiment, the display panel may be curved in a second direction as viewed relative to a reference axis parallel to a first direction with respect to a plane defined by the first direction and a second direction. The middle frame may include a first supporter extending parallel to the first direction to support the display panel, a second supporter facing the first supporter, supporting the display panel, and spaced apart from the first supporter in the second direction, a third supporter extending parallel to the second direction to support the display panel, and a fourth supporter facing the third supporter, supporting the display panel, and spaced apart from the third supporter in the first direction. The first coupling member may be provided in a plural number, and the first coupling members may be disposed between the first supporter and the display panel, between the second supporter and the display panel, and between the third supporter and the display panel.

In an exemplary embodiment, the display device may further include an elastic member disposed between the fourth supporter and the display panel and a top chassis covering an area of the display panel overlapping the fourth supporter when viewed in a plan view and being coupled to the middle frame.

In an exemplary embodiment, the first coupling member may be a double-sided tape, and the second coupling member may be a curable resin.

Exemplary embodiments of the invention may provide a display device including a display panel, a middle frame disposed under the display panel, and a coupling unit disposed between the middle frame and the display panel to couple the middle frame and the display panel. The coupling unit may include first coupling parts, at least one connection part disposed between the first coupling parts to connect two first coupling parts adjacent to each other, and a second coupling part disposed between two first coupling parts adjacent to each other. The second coupling part may be surrounded by the two first coupling parts adjacent to each other and the connection part.

In an exemplary embodiment, the first coupling parts and the connection part may be a double-sided tape, and the second coupling part is a curable resin.

According to the above, the display panel and the middle frame are fixed to each other by the first coupling member and the second coupling member. As a result, defects occurring in the display device during the evaluation of the reliability of the product may be reduced, and the rework process used to separate the display panel from the middle frame may be easily performed.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

The following description with reference to the accompanying drawings is provided to assist in a comprehensive understanding of various embodiments of the invention as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the invention. In addition, descriptions of well-known functions and constructions may be omitted for clarity and conciseness.

It will be understood that, although the terms first, second, third, etc. may be used herein to describe various elements, components, regions, layers, direction and/or sections, these elements, components, regions, layers, direction and/or sections should not be limited by these terms. These terms are only used to distinguish one element, component, region, layer, direction, or section from another element, component, region, layer, direction, or section. Thus, a first element, component, region, layer, direction, or section discussed below could be termed a second element, component, region, layer, direction, or section without departing from the teachings of the present disclosed subject matter.

Hereinafter, the invention will be explained in detail with reference to the accompanying drawings.

Figure 1:
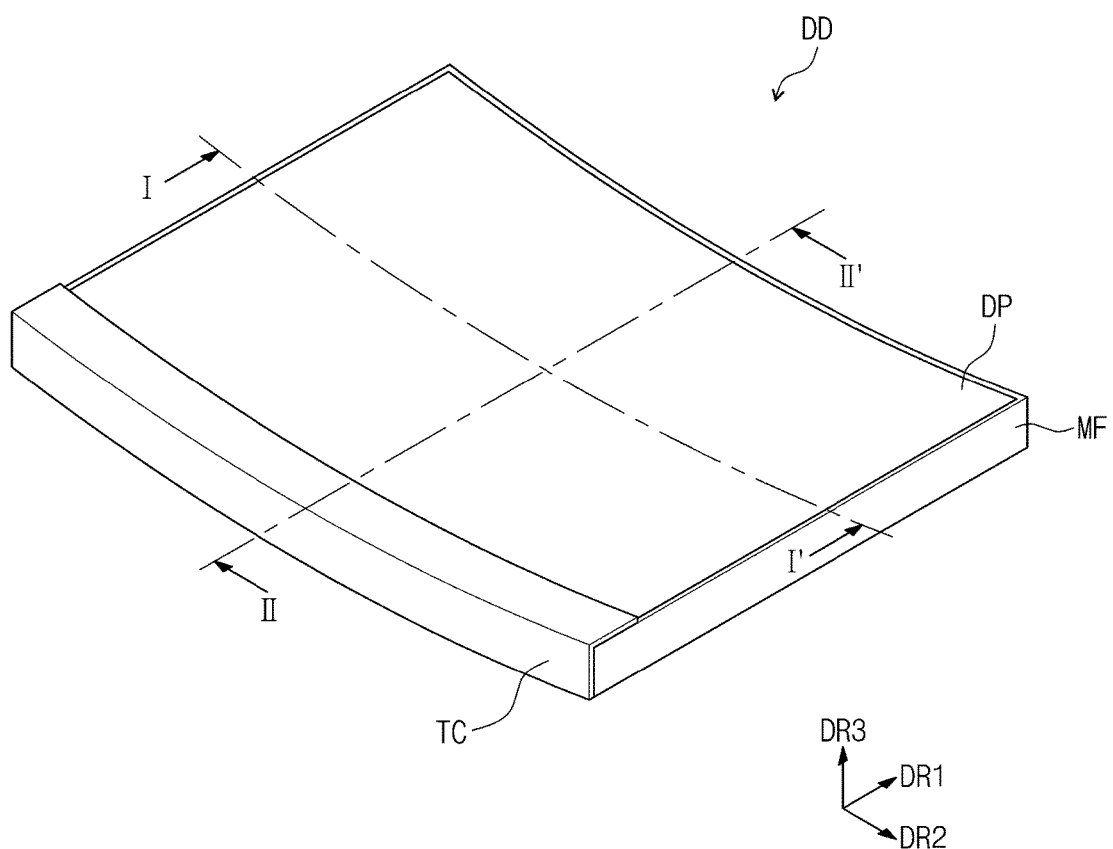
FIG. 1 is a perspective view showing a display device according to an exemplary embodiment of the invention.

FIG. 1 is a perspective view showing a display device DD according to an exemplary embodiment of the invention.

Referring to FIG. 1, the display device DD displays an image through a curved display surface. The display surface is curved in a second direction DR2 with respect to a plane surface defined by a first direction DR1 and the second direction DR2. According to another exemplary embodiment of the invention, the display device may have a flat shape. In this case, the display device may display the image through a flat display surface.

In exemplary embodiments, the display device DD may be applied to an electronic device, such as a television set, an outdoor billboard, a notebook computer, etc., a small and medium-sized electronic item, e.g., a center information display ("CID") for a car, a wrist-type electronic device, a personal digital assistant ("PDA"), a portable multimedia player ("PMP"), a game unit, a tablet personal computer ("PC"), a car navigation unit, a camera, etc., but it should not be limited thereto or thereby.

Figure 2:
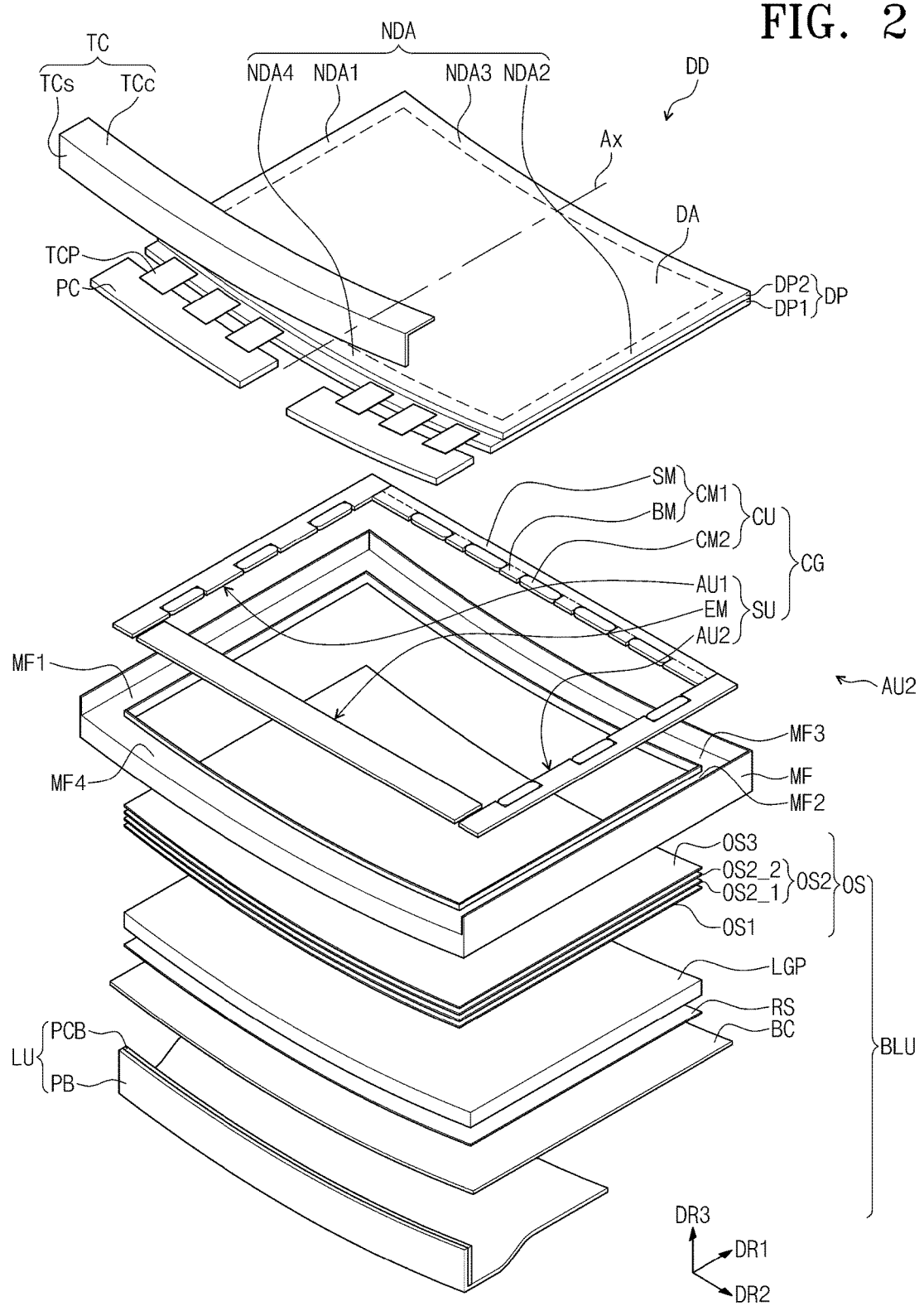
FIG. 2 is an exploded perspective view showing an exemplary embodiment of a display device according to the invention.

FIG. 2 is an exploded perspective view showing a display device DD according to an exemplary embodiment of the invention.

Referring to FIG. 2, the display device DD includes a display panel DP, a middle frame MF, a coupling group CG, and a backlight unit BLU.

The display panel DP generates an image corresponding to image data applied thereto. The display panel DP according to the illustrated exemplary embodiment may be, but not limited to, a liquid crystal display panel, an organic light emitting display panel, a plasma display panel, an electrophoretic display panel, or an electrowetting display panel, for example. In the illustrated exemplary embodiment, the liquid crystal display panel will be described as the liquid crystal display panel, for example.

The display panel DP includes a first substrate DP1, a second substrate DP2 facing the first substrate DP1, and a liquid crystal layer (not shown) interposed between the first substrate DP1 and the second substrate DP2. The liquid crystal layer includes liquid crystal molecules aligned in accordance with an electric field formed between the first substrate DP1 and the second substrate DP2. Although not shown separately, a pair of polarizers is respectively disposed on and under the display panel DP. The display panel DP is curved with respect to a plane defined by the first direction DR1 and the second direction DR2 as viewed relative to a reference axis Ax substantially parallel to the first direction DR1.

A plurality of tape carrier packages TCP is disposed at at least one side of the first substrate DP1. A data driving chip (not shown) is disposed on each of the tape carrier packages TCP. The data driving chip generates a data signal applied to a data line of the display panel DP in response to an external signal. The external signal is provided from a printed circuit board PC and includes an image signal, various control signals, and a driving voltage. The printed circuit board PC is electrically connected to the display panel DP by the tape carrier packages.

The display surface of the display panel DP includes a display area DA and a non-display area NDA. The display area DA displays the image, and the non-display area NDA does not display the image. The non-display area NDA surrounds the display area DA.

The non-display area NDA includes a first non-display area NDA1, a second non-display area NDA2, a third non-display area NDA3, and a fourth non-display area NDA4. The first and second non-display areas NDA1 and NDA2 extend in the first direction DR1. When viewed in a plan view, the first non-display area NDA1 faces the second non-display area NDA2 such that the display area DA is disposed between the first and second non-display areas NDA1 and NDA2. The third and fourth non-display areas NDA3 and NDA4 extend in the second direction DR2. When viewed in a plan view, the third non-display area NDA3 faces the fourth non-display area NDA4 such that the display area DA is disposed between the third and fourth non-display areas NDA3 and NDA4. Since the display panel DP has the shape curved in the second direction DR2, the third and fourth non-display areas NDA3 and NDA4 have a curved shape.

The middle frame MF is disposed under the display panel DP. The middle frame MF supports the non-display area NDA of the display panel DP. The middle frame MF includes a first supporter MF1, a second supporter MF2, a third supporter MF3, and a fourth supporter MF4. The first and second supporters MF1 and MF2 extend in the first direction DR1. When viewed in a plan view, the first supporter MF1 faces the second supporter MF2 such that the display area DA is disposed between the first and second supporters MF1 and MF2. The third and fourth supporters MF3 and MF4 extend in the second direction DR2. When viewed in a plan view, the third supporter MF3 faces the fourth supporter MF4 such that the display area DA is disposed between the third and fourth supporters MF3 and MF4. Since the middle frame MF has a shape corresponding to that of the display panel DP, the third and fourth supporters MF3 and MF4 have a shape curved in the second direction DR2.

The first supporter MF1 supports the first non-display area NDA1, the second supporter MF2 supports the second non-display area NDA2, the third supporter MF3 supports the third non-display area NDA3, and the fourth supporter MF3 supports the fourth non-display area NDA4.

The coupling group CG is disposed between the display panel DP and the middle frame MF. The coupling group CG includes a coupling unit CU and a support unit SU. The support unit SU includes a first adhesive unit AU1, a second adhesive unit AU2, and an elastic member EM. The first adhesive unit AU1 is disposed between the first non-display area NDA1 and the first supporter MF1, a second adhesive unit AU2 is disposed between the second non-display area NDA2 and the second supporter MF2, and the coupling unit CU is disposed between the third non-display area NDA3 and the third supporter MF3.

The display device DD may further include a top chassis TC. The top chassis TC includes a cover part TCc covering the fourth non-display area NDA4 and a sidewall part TCs bent and extending from the cover part TCc. The cover part TCc pushes the fourth non-display area NDA4 below to allow the display panel DP to be adhered to the middle frame MF, and the sidewall part TCs is coupled to the middle frame MF.

The elastic member EM is disposed between the fourth non-display area NDA4 and the fourth supporter MF4. The elastic member EM fills a space between the display panel DP and the fourth supporter MF4. In the exemplary embodiment, since the fourth non-display area NDA4 is pushed down by the top chassis TC, the elastic member EM does not have an adhesive property, but it should not be limited thereto or thereby. According to another exemplary embodiment, the elastic member EM may have the adhesive strength provided on one surface thereof, and thus the elastic member EM may be attached to the display panel DP, or the elastic member EM may have the adhesive strength provided on opposite surfaces thereof, and thus the elastic member EM may be attached to the fourth supporter MF4 and the display panel DP.

The backlight unit BLU includes a light guide plate LGP, a light source unit LU, optical sheets OS, and a bottom chassis BC.

The light source unit LU is disposed at a position adjacent to one side portion of the light guide plate LGP. The light source unit LU includes a light source LD (refer to FIG. 5), a printed circuit board PCB, and a heat sink bar PB. The light source LD (refer to FIG. 5) is mounted on the printed circuit board PCB to receive a driving voltage from printed circuit board PCB. The light source LD (refer to FIG. 5) provides a light to the light guide plate LGP in response to the driving voltage. The heat sink bar PB is disposed on a rear surface of the printed circuit board PCB to discharges heat generated from the light source LD (refer to FIG. 5).

The light guide plate LGP receives the light from the light source LD (refer to FIG. 5) and guides the light to the display panel DP. In an exemplary embodiment, the light guide plate LGP may include at least one of polyamide ("PA"), polymethyl methacrylate ("PMMA"), methyl methacrylate-styrene ("MS"), and polycarbonate ("PC"), for example, but a material for the light guide plate LGP should not be limited thereto or thereby.

In the illustrated exemplary embodiment, the light source LD (refer to FIG. 5) is disposed at the position adjacent to the one side portion of the light guide plate LGP, but it should not be limited thereto or thereby. According to another exemplary embodiment, for example, the light source LD (refer to FIG. 5) may be disposed under the display panel DP to provide the light to the display panel DP, and thus the light guide plate LGP may be omitted.

The optical sheets OS are disposed between the light guide plate LGP and the display panel DP. The optical sheets OS are curved corresponding to a curvature of the light guide plate LGP on the light guide plate LGP. The optical sheets OS control a path of the light guided by the light guide plate LGP.

The optical sheets OS include a diffusion sheet OS1, a prism sheet OS2, and a protective sheet OS3. The diffusion sheet OS1 diffuses the light, and the prism sheet OS2 condenses the light such that the light diffused by the diffusion sheet OS1 travels in a direction closer to a normal line direction of the display panel DP. The prism sheet OS2 may be provided in a plural number (OS2_1, OS2_2). The protective sheet OS3 protects the prism sheet OS2 from external impacts. In the illustrated exemplary embodiment, the optical sheets OS include one diffusion sheet OS1, one protective sheet OS3, and two prism sheets OS2, but they should not be limited thereto or thereby. According to another exemplary embodiment, at least one of the diffusion sheet OS1, the prism sheet OS2, and the protective sheet OS3 may be provided in a plural number, or one or more of the diffusion sheet OS1, the prism sheet OS2, and the protective sheet OS3 may be omitted from the optical sheets OS, for example, when necessary.

Figure 3:
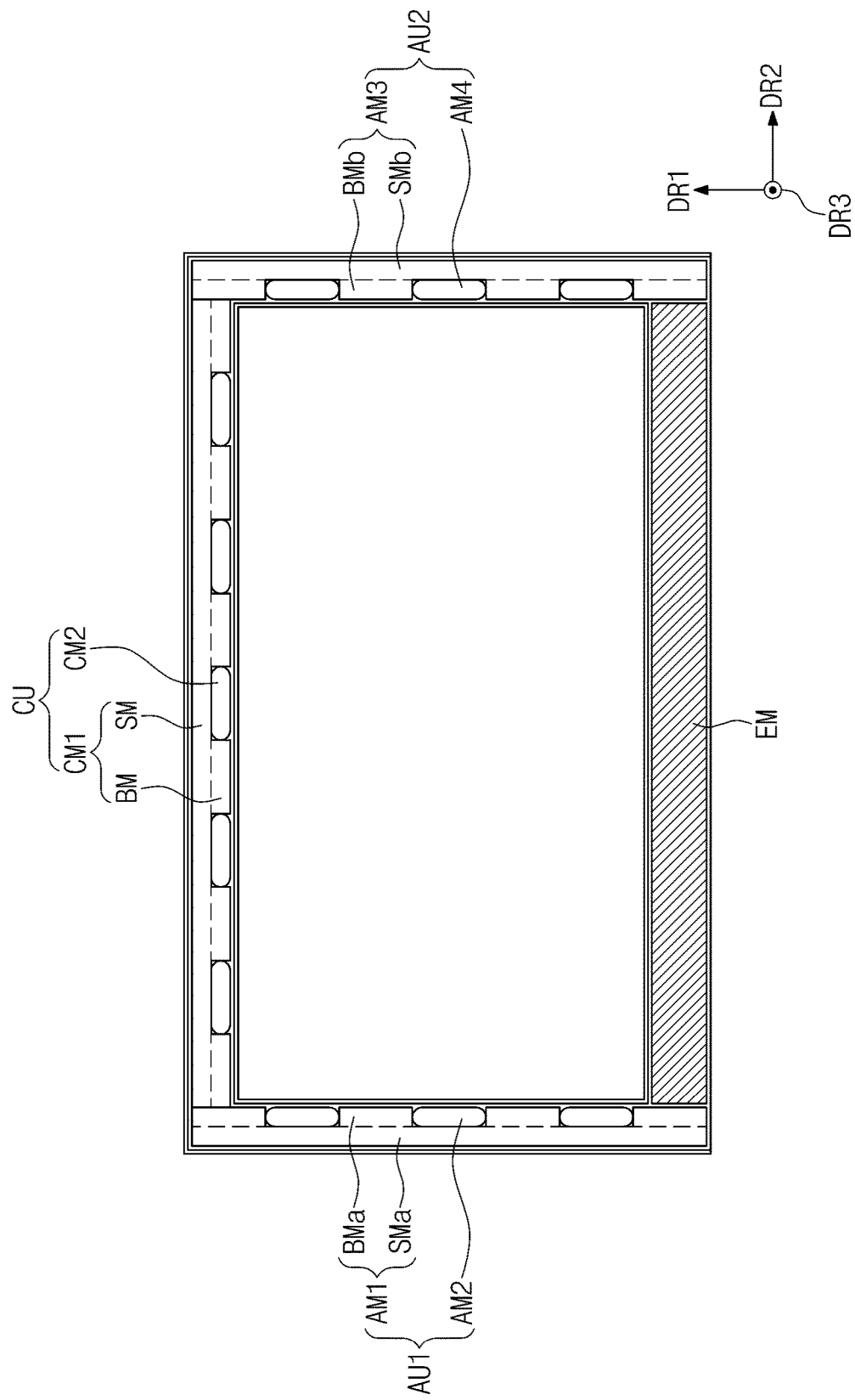
FIG. 3 is a plan view showing an exemplary embodiment of a part of components of a display device according to the invention.

The reflective sheet RS is disposed between the light guide plate LGP and the bottom chassis BC. The reflective sheet RS reflects the light leaking from the light guide plate LGP to allow the leaked light to be incident to the light guide plate LGP again. However, the reflective sheet RS may be omitted according to exemplary embodiments. In an exemplary embodiment, a light reflective material may be coated on the bottom chassis BC, and in this case, the light reflective material may serve as the reflective sheet RS, for example. In another exemplary embodiment, reflective sheet RS may be omitted. The light reflective material should not be limited to a certain material FIG. 3 is a plan view showing a part of components of a display device according to an exemplary embodiment of the invention. In detail, FIG. 3 shows the middle frame MF on which the coupling unit CU, the first adhesive unit AU1, the second adhesive unit AU2, and the elastic member EM are disposed. In FIG. 3, each component is exaggerated for the convenience of explanation, and thus the scale is not necessarily limited to that illustrated in FIG. 3.

Referring to FIGS. 2 and 3, the coupling unit CU includes a first coupling member CM1 and a second coupling member CM2.

The first coupling member CM1 includes a reference coupling part SM and a plurality of branch coupling parts BM. The reference coupling part SM extends in a predetermined direction. In the illustrated exemplary embodiment, the reference coupling part SM extends in the second direction DR2. Each of the branch coupling parts BM is protruded from the reference coupling part SM. In an exemplary embodiment, each of the branch coupling parts BM is protruded in a direction different from a direction in which the reference coupling part SM extends, for example. In the illustrated exemplary embodiment, the branch coupling parts BM extend in a direction substantially parallel to the first direction DR1 and are protruded from the reference coupling part SM. In more detail, the branch coupling parts BM extend in a direction adjacent to the display area DA when viewed in a plan view. The branch coupling parts BM are arranged between the reference coupling part SM and the display area DA in the plan view. The branch coupling parts BM are arranged spaced apart from each other in the second direction DR2.

The second coupling member CM2 is disposed between two branch coupling parts adjacent to each other among the branch coupling parts BM. The second coupling member CM2 is surrounded by the two adjacent branch coupling parts and the reference coupling part SM.

In an exemplary embodiment, the first coupling member CM1 may be, but not limited to, a double-sided tape, and the second coupling member CM2 may be, but not limited to, a curable resin, for example. In an exemplary embodiment, the second coupling member CM2 may be cured by heat, ultraviolet ray, electron beam, etc., for example. When the second coupling member CM2 is cured, an adhesive strength of the second coupling member CM2 becomes stronger.

Different from the exemplary embodiment, in a case that the display panel DP and the middle frame MF are fixed to each other by using only the first coupling member CM1, the display panel DP may be separated from the middle frame MF due to a restoring force of the curved display panel DP. When the adhesive strength of the first coupling member CM1 is enhanced to prevent the display panel DP from being separated from the middle frame MF, it is difficult to perform a rework process for the display panel DP, and as a result, a manufacturing product yield of the display panel DP is lowered. In addition, a shearing stress caused by a difference in thermal expansion coefficient between the display panel DP and the middle frame MF strongly occurs in the first coupling member CM1 when a thermal impact reliability is evaluated. As a result, the first coupling member CM1 may be separated from the display panel DP or the middle frame MF. In addition, in a case that the display panel DP and the middle frame MF are fixed to each other by using only the second coupling member CM2, a distance between the display panel DP and the middle frame MF may not be constantly maintained until the second coupling member CM2 is cured.

However, according to the illustrated exemplary embodiment, the display panel DP and the middle frame MF are fixed to each other by using the first coupling member CM1 and the second coupling member CM2. Since the first coupling member CM1 holds the display panel DP and the middle frame MF, the distance between the display panel DP and the middle frame MF may be maintained until the second coupling member CM2 is cured. Since the cured second coupling member CM2 has the adhesive strength stronger than that of the first coupling member CM1, a phenomenon in which the display panel DP is separated from the middle frame MF due to the restoring force of the curved display panel DP may be reduced. In addition, since the second coupling member CM2 has elasticity, the phenomenon in which the display panel DP is separated from the middle frame MF may be reduced even though the shearing stress is applied to the coupling unit CU during the evaluation of the thermal impact reliability.

The first adhesive unit AU1 includes a first adhesive member AM1 and a second adhesive member AM2.

The first adhesive member AM1 includes a first reference adhesive part SMa and a plurality of first branch adhesive parts BMa. The first reference adhesive part SMa extends in a predetermined direction, e.g., the first direction DR1. Each of the first branch adhesive parts BMa is protruded from the first reference adhesive part SMa. The first branch adhesive parts BMa extend in a direction substantially parallel to the second direction DR2. In the illustrated exemplary embodiment, the first branch adhesive parts BMa extend in a direction adjacent to the display area DA when viewed in a plan view. The first branch adhesive parts BMa are arranged between the first reference adhesive part SMa and the display area DA when viewed in a plan view. The second adhesive member AM2 is disposed between two first branch adhesive parts BMa adjacent to each other among the first branch adhesive parts BMa.

The second adhesive unit AU2 includes a third adhesive member AM3 and a fourth adhesive member AM4.

The third adhesive member AM3 includes a second reference adhesive part SMb and a plurality of second branch adhesive parts BMb. The second reference adhesive part SMb extends in a predetermined direction, e.g., the first direction DR1. Each of the second branch adhesive parts BMb is protruded from the second reference adhesive part SMb. The second branch adhesive parts BMb extend in a direction substantially parallel to the second direction DR2. In the illustrated exemplary embodiment, the second branch adhesive parts BMb extend in a direction adjacent to the display area DA when viewed in a plan view. The second branch adhesive parts BMb are arranged between the second reference adhesive part SMb and the display area DA when viewed in a plan view. The fourth adhesive member AM4 is disposed between two second branch adhesive parts BMb adjacent to each other among the second branch adhesive parts BMb.

The first adhesive member AM1 and the third adhesive member AM3 include substantially the same material as that of the first coupling member CM1. In an exemplary embodiment, each of the first adhesive member AM1 and the third adhesive member AM3 may be a double-sided tape, for example. The second adhesive member AM2 and the fourth adhesive member AM4 include substantially the same material as that of the second coupling member CM2. In an exemplary embodiment, each of the second adhesive member AM2 and the fourth adhesive member AM4 may be a cured resin, for example. In an exemplary embodiment, the second adhesive member AM2 and the fourth adhesive member AM4 include silicon, for example.

Figure 4:
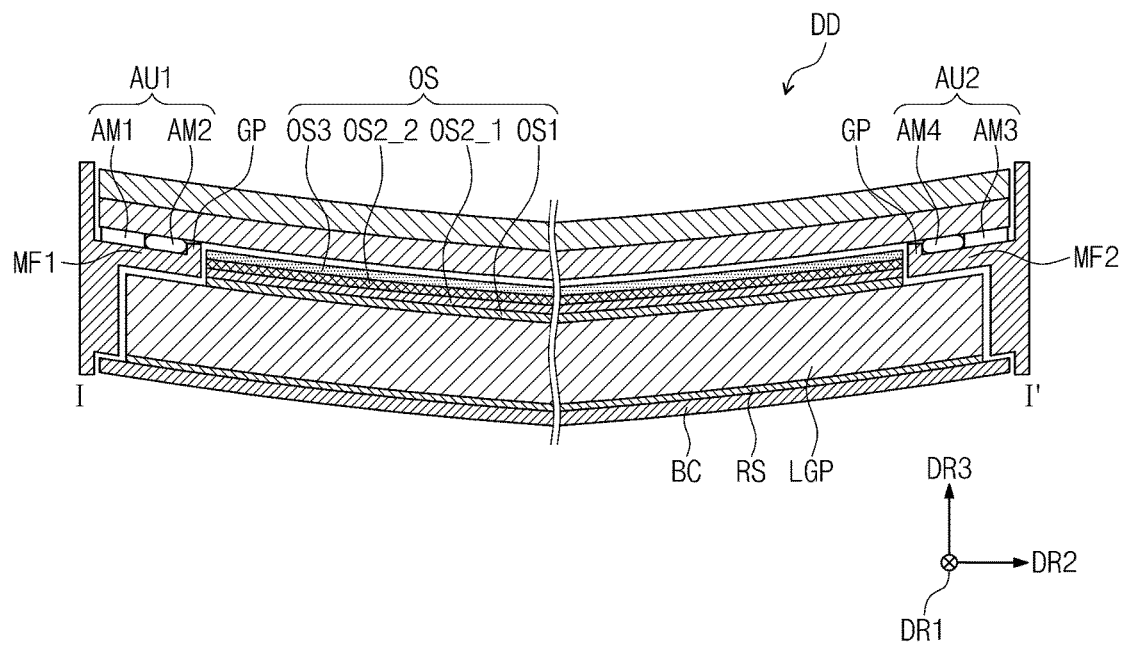
FIG. 4 is a cross-sectional view taken along line I-I' to show a display device.

FIG. 4 is a cross-sectional view taken along line I-I' to show a display device.

Referring to FIGS. 2 and 4, the middle frame MF further includes a guide part GP protruded from each of the first supporter MF1 and a second supporter MF2 to a third direction DR3. The guide part GP has a height in the third direction DR3 smaller than a thickness of the first adhesive unit AU1 and the second adhesive unit AU2 in the third direction DR3.

The first adhesive member AM1 is attached to the first supporter MF1 and the second adhesive member AM2 is coated on the first supporter MF1. In addition, the third adhesive member AM3 is attached to the second supporter MF2 and the fourth adhesive member AM4 is coated on the second supporter MF2. The guide part GP guides positions at which the second and fourth adhesive members AM2 and AM4 are coated. Further, the guide part GP prevents the second and fourth adhesive members AM2 and AM4, which are not cured, from slipping out of the second and fourth adhesive members AM2 and SM4.

Figure 5:
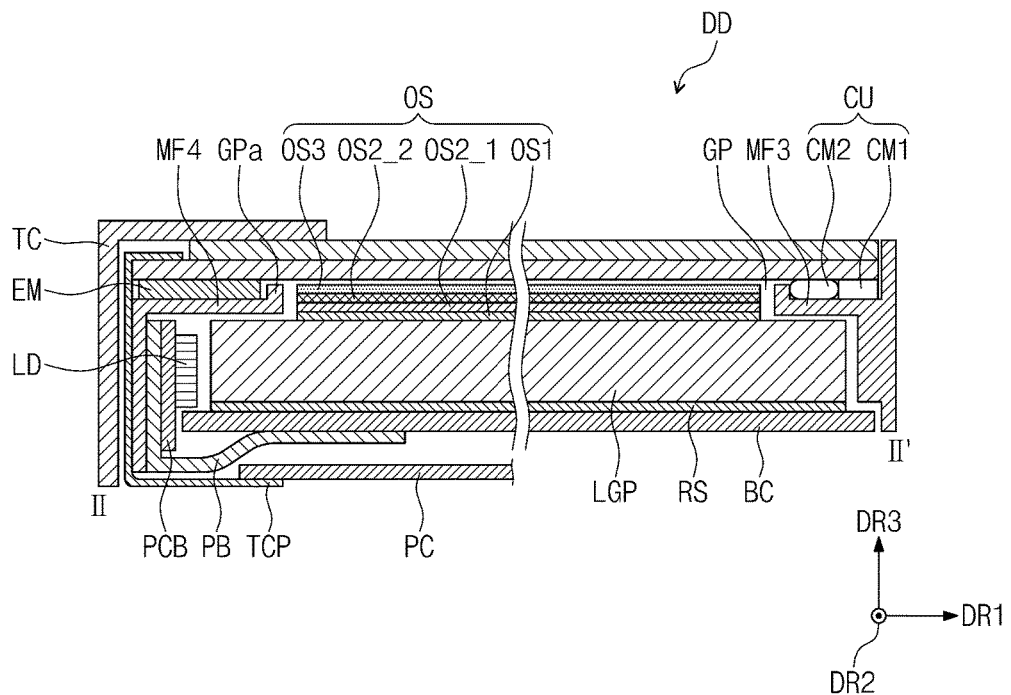
FIG. 5 is a cross-sectional view taken along line II-II' to show a display device.

FIG. 5 is a cross-sectional view taken along line II-II' to show a display device.

Referring to FIG. 5, a guide part GP is disposed on the third supporter MF3 to be protruded in the third direction DR3, a guide part GPa is disposed on the fourth supporter MF4 to be protruded in the third direction DR3. The guide part GPa prevents the elastic member EM from moving to the display area DA (refer to FIG. 2). According to another exemplary embodiment, the guide part GPa of the fourth supporter MF4 may be omitted.

Although not shown in FIG. 5, the top chassis TC is coupled to the middle frame MF by a coupling member, e.g., a screw. In addition, the bottom chassis BC and the middle frame MF are coupled to each other by a coupling member, such as a double-sided tape or a screw.

FIG. 5 shows the bottom chassis BC having a flat plate shape as a representative example, but the shape of the bottom chassis BC should not be limited to the flat plate shape. According to another exemplary embodiment, the top chassis TC may include a bottom part and a sidewall part extending from the bottom part to the third direction DR3, for example. In this case, a screw used to fix the top chassis TC and the middle frame MF may be coupled to the sidewall part of the bottom chassis BC after being elongated.

Figure 6:
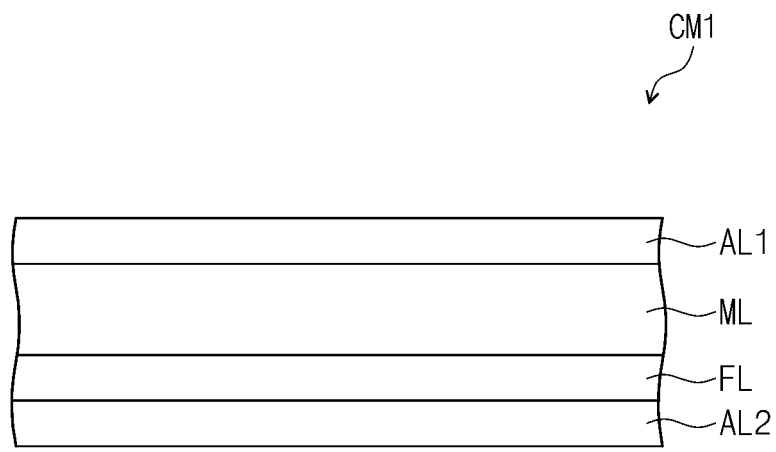
FIG. 6 is a cross-sectional view showing an exemplary embodiment of a first coupling member according to the invention.

FIG. 6 is a cross-sectional view showing the first coupling member CM1 according to an exemplary embodiment of the invention.

Referring to FIGS. 2 and 6, the first coupling member CM1 includes a first adhesive layer AL1, a second adhesive layer AL2, a polymer resin layer ML, and a film layer FL. The polymer resin layer ML is disposed between the first adhesive layer AL1 and the second adhesive layer AL2, and the film layer FL is disposed between the polymer resin layer ML and the second adhesive layer AL2.

The first adhesive layer AL1 is attached to the display panel DP, and the second adhesive layer AL2 is attached to the middle frame MF.

In an exemplary embodiment, the polymer resin layer ML includes a polymer resin, e.g., polyurethane, polycarbonate, polypropylene, polyethylene, etc., or a sponge formed by foam molding a rubber solution, an urethane-based material, or an acrylic-based material. Since the polymer resin layer ML has elasticity, the shearing stress caused by the difference in thermal expansion coefficient between the display panel DP and the middle frame MF may be offset by the polymer resin layer ML when the thermal impact reliability is evaluated. In addition, the display panel DP may be easily separated from the middle frame MF by cutting the polymer resin layer ML during the rework process.

When the polymer resin layer ML is cut, a portion of the second adhesive layer AL2, the film layer FL, and the polymer resin layer ML is attached to the middle frame MF. In this case, when the film layer FL is pulled in a horizontal direction, the second adhesive layer AL2 is easily separated from the middle frame MF. Accordingly, the rework process desired to repair defects generated during the manufacturing process of the display device DD may be more easily performed.

Figure 7:
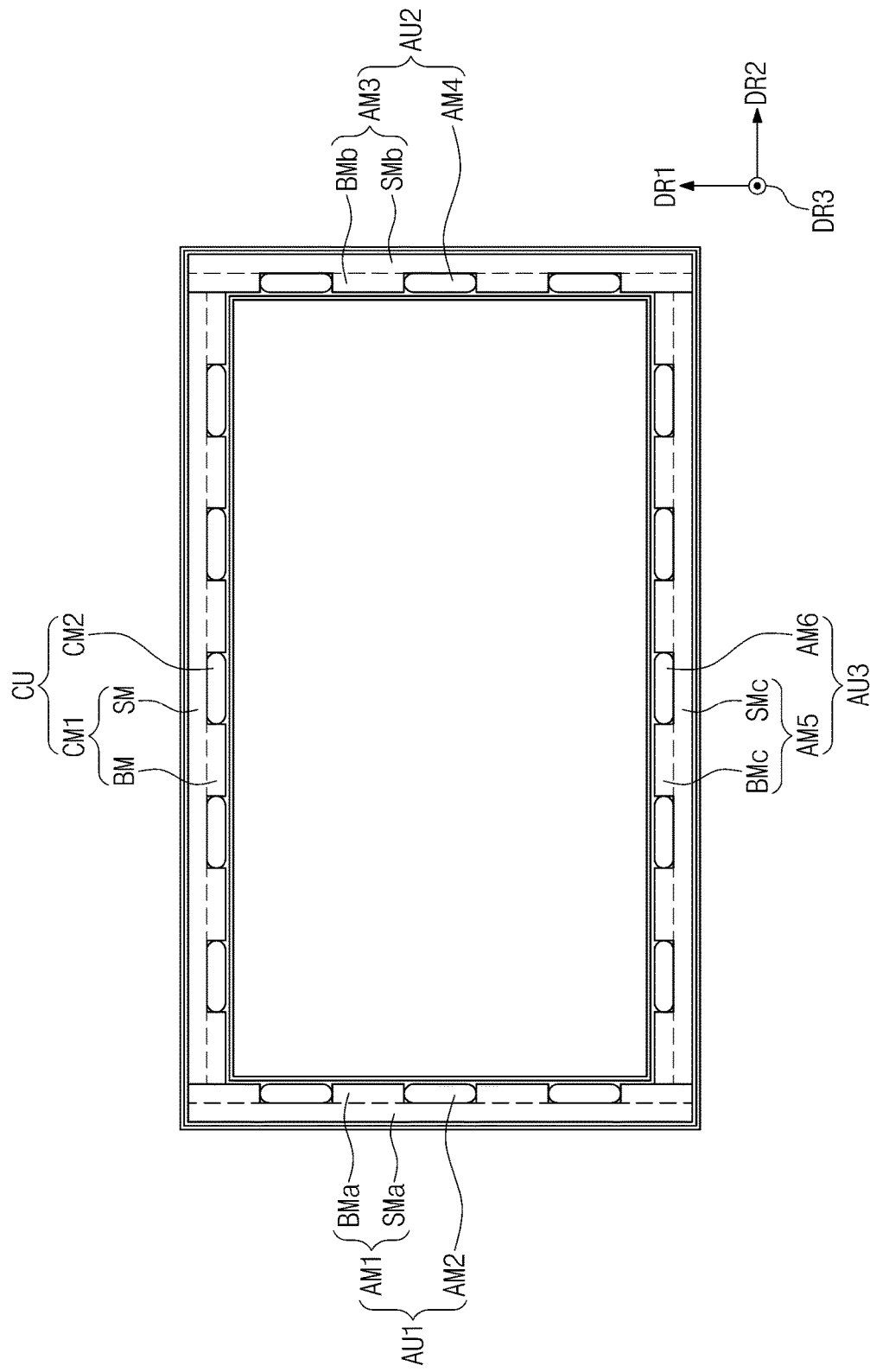
FIG. 7 is a plan view showing an exemplary embodiment of a part of components of a display device according to the invention.

FIG. 7 is a plan view showing a part of components of a display device according to an exemplary embodiment of the invention. The display device shown in FIG. 7 further includes a third adhesive unit AU3 different from the display device shown in FIG. 3.

Referring to FIGS. 2 and 7, the third adhesive unit AU3 is disposed between the fourth non-display area NDA4 and the fourth supporter MF4 instead of the elastic member EM. The third adhesive unit AU3 includes a fifth adhesive member AM5 and a sixth adhesive member AM6.

The fifth adhesive member AM5 includes a third reference adhesive part SMc and a plurality of third branch adhesive parts BMc. The third reference adhesive part SMc extends in a predetermined direction, e.g., the second direction DR2. Each of the third branch adhesive parts BMc is protruded from the third reference adhesive part SMc. The third branch adhesive parts BMc are protruded in a direction substantially parallel to the first direction DR1. In the illustrated exemplary embodiment, the third branch adhesive parts BMc are protruded in a direction adjacent to the display area DA when viewed in a plan view. The third branch adhesive parts BMc are arranged between the third reference adhesive part SMc and the display area DA when viewed in a plan view. The sixth adhesive member AM6 is disposed between two third branch adhesive parts BMc adjacent to each other among the third branch adhesive parts BMc.

In the case that the fourth supporter MF4 is fixed to the fourth non-display area NDA4 by the third adhesive unit AU3, the top chassis TC may be omitted. However, a member that covers the tape carrier packages arranged in the fourth non-display area NDA4 may be added.

Figure 8:
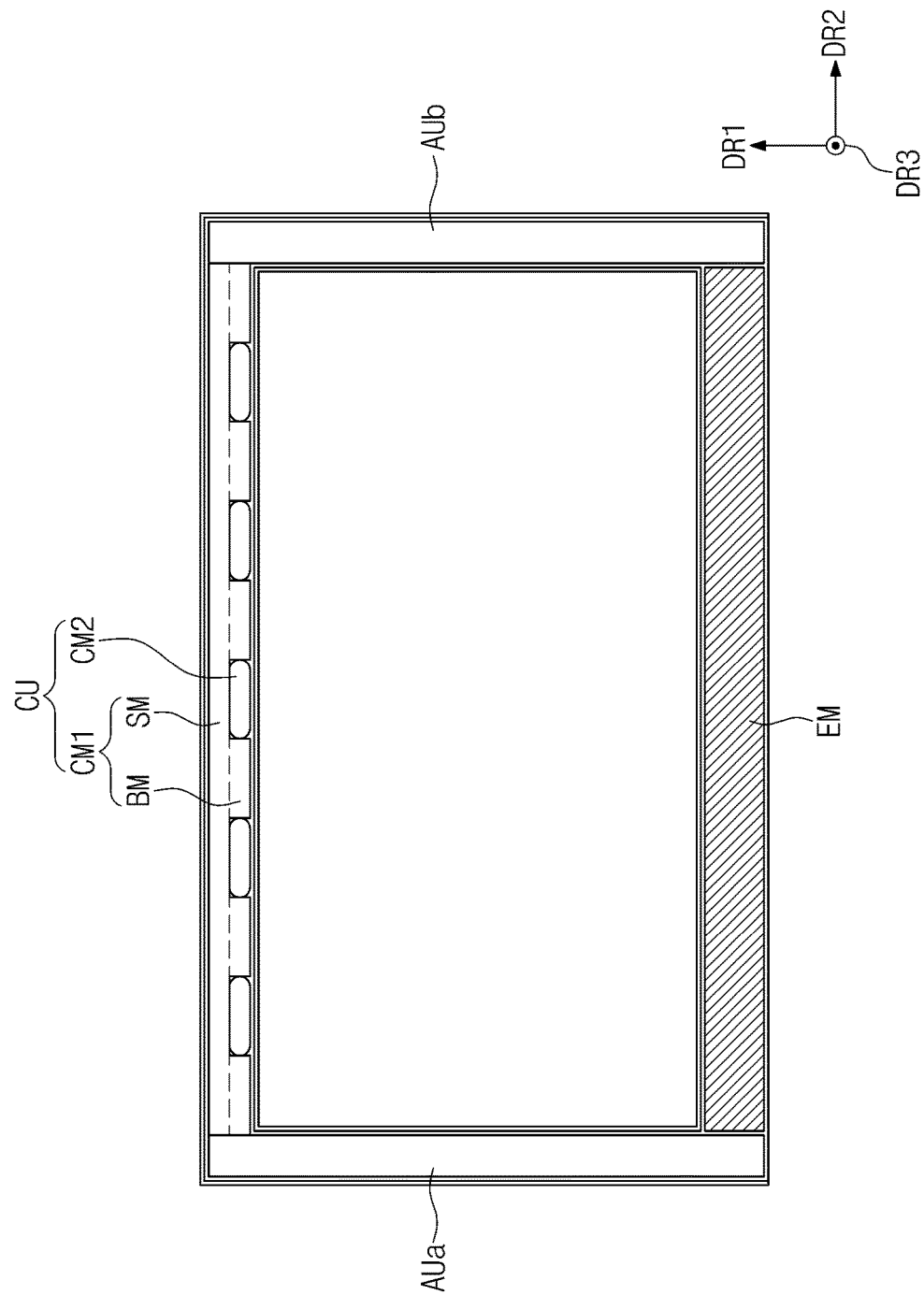
FIG. 8 is a plan view showing an exemplary embodiment of a part of components of a display device according to the invention.

FIG. 8 is a plan view showing a part of components of a display device according to an exemplary embodiment of the invention. The display device shown in FIG. 8 includes first and second adhesive units AUa and AUb different from those of the display device shown in FIG. 3.

The first and second adhesive units AUa and AUb include substantially the same material as that of the first coupling member CM1 or the second coupling member CM2. In an exemplary embodiment, each of the first and second adhesive units AUa and AUb may be a double-sided tape extending in the first direction DR1 or a curable resin coated along the first direction DR1, for example. In addition, the elastic member EM includes substantially the same material as that of the first coupling member CM1 or the second coupling member CM2. In an exemplary embodiment, the elastic member EM may be a double-sided tape extending in the second direction DR2 or a curable resin coated along the second direction DR2, for example.

Figure 9:
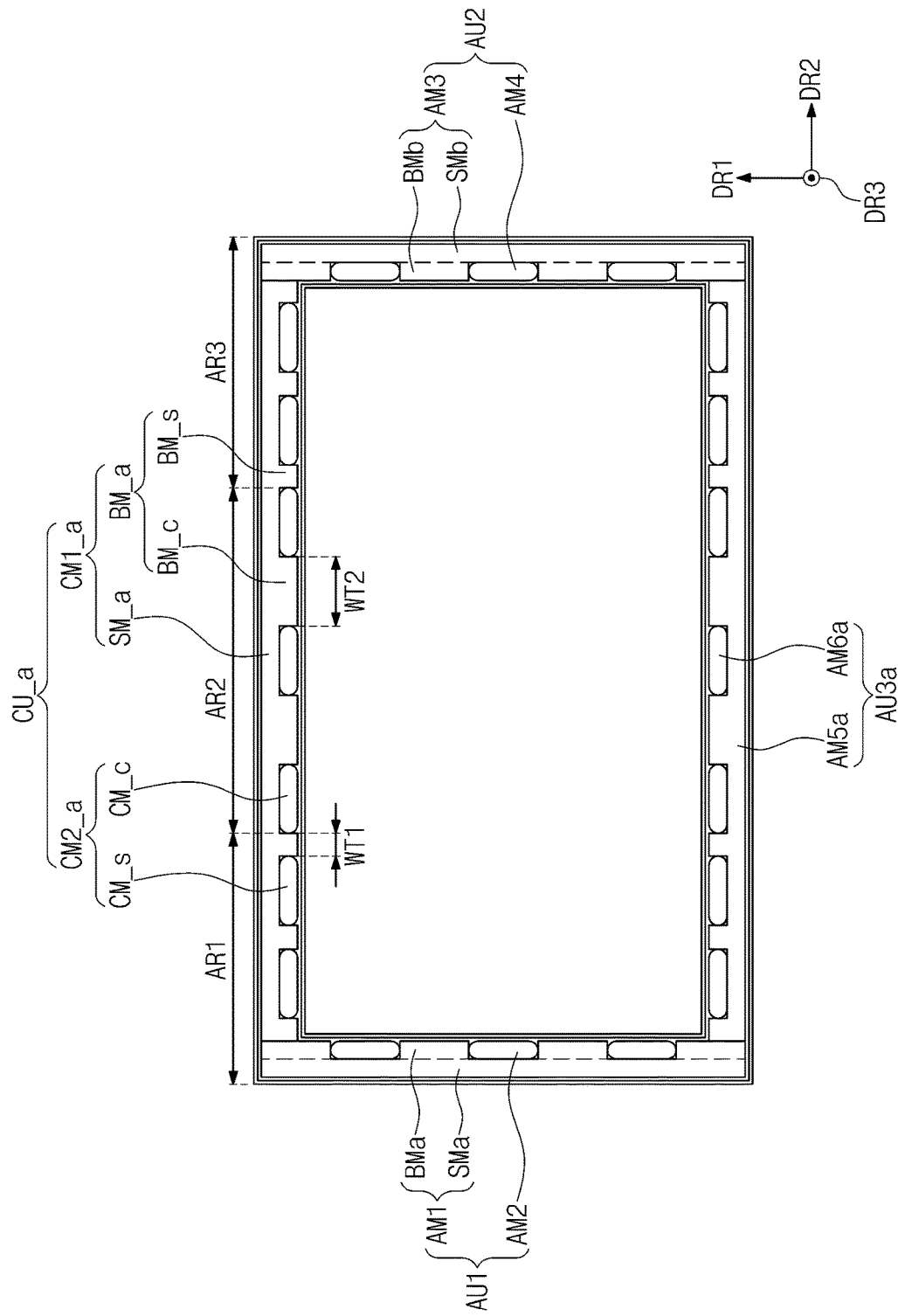
FIG. 9 is a plan view showing an exemplary embodiment of a part of components of a display device according to the invention.

FIG. 9 is a plan view showing a part of components of a display device according to an exemplary embodiment of the invention. The display device shown in FIG. 9 includes a coupling unit CU_a and a third adhesive unit AU3a, which are different from those of the display device shown in FIG. 7.

The third non-display area NDA3 (refer to FIG. 2) includes a first area AR1, a second area AR2, and a third area AR3, which are sequentially arranged in the second direction DR2. Since the display panel DP is not shown in FIG. 9, reference numerals of the first, second, and third areas AR1, AR2, and AR3 are marked onto the middle frame MF (refer to FIG. 2) overlapping the first, second, and third areas AR1, AR2, and AR3.

The coupling unit CU_a includes a first coupling member CM1_a and a second coupling member CM2_a. The first coupling member CM1_a includes a reference coupling part SM_a and branch coupling parts BM_a. The reference coupling part SM_a extends in the second direction DR2, and the branch coupling parts BM_a are protruded from the reference coupling part SM_a. The second coupling member CM2_a is disposed between two branch coupling members adjacent to each other among the branch coupling parts BM_a.

The branch coupling parts BM_a include an outer branch coupling part BM_s attached to the first area AR1 and the third area AR3 and a center branch coupling part BM_c attached to the second area AR2. The second coupling member CM2_a includes an outer coupling member CM_s attached to the first and third areas AR1 and AR3 and a center coupling member CM_c attached to the second area AR2.

In the case where the display panel DP is curved along the second direction DR2, maintaining a curvature in a center portion of the display panel DP is relatively easier than that of an edge portion of the display panel DP due to the weight of the display panel DP. The center portion includes the second area AR2 and extends along the first direction DR1, and the edge portion includes the first and third areas AR1 and AR3 and extends along the first direction DR1.

The restoring force in the edge portion of the display panel DP may be greater than that in the center portion of the display panel DP. Accordingly, the first and third areas AR1 and AR3 included in the edge portion of the display panel DP are desired to be more firmly fixed than the second area AR2 included in the center portion of the display panel DP. Therefore, when the display panel DP is coupled to the middle frame MF, a ratio of the second coupling member CM2_a in each area may be different.

In the illustrated exemplary embodiment, a ratio of an area of the outer coupling member CM_s to an area of the first and third areas AR1 and AR3 is referred to as a first ratio. In addition, a ratio of an area of the center coupling member CM_c to an area of the second area AR2 is referred to as a second ratio. Since the adhesive strength of the cured resin is stronger than the adhesive strength of the double-sided tape, the first ratio may be greater the second ratio. Accordingly, the first and third areas AR1 and AR3 of the curved display panel DP may be more securely coupled to the middle frame MF than the second area AR2 of the curved display panel DP.

The outer branch coupling part BM_s has a first width WT1, and the center branch coupling part BM_c has a second width WT2. Each of the first and second widths WT1 and WT2 indicates a width in a direction parallel to the second direction DR2. The first width WT1 may be smaller than the second width WT2. The center coupling member CM_c and the outer coupling member CM_s may have the same size. Accordingly, a density of the outer coupling member CM_s arranged in the first and third areas AR1 and AR3 may be higher than a density of the center coupling member CM_c arranged in the second area AR2.

The third adhesive unit AU3a includes a fifth adhesive member AM5a and a sixth adhesive member AM6a. The fifth adhesive member AM5a is symmetrical with the first coupling member CM1_a with respect to a symmetrical axis extending in the second direction DR2. However, the third adhesive unit AU3a may be replaced with the elastic member EM shown in FIG. 3.

Figure 10:
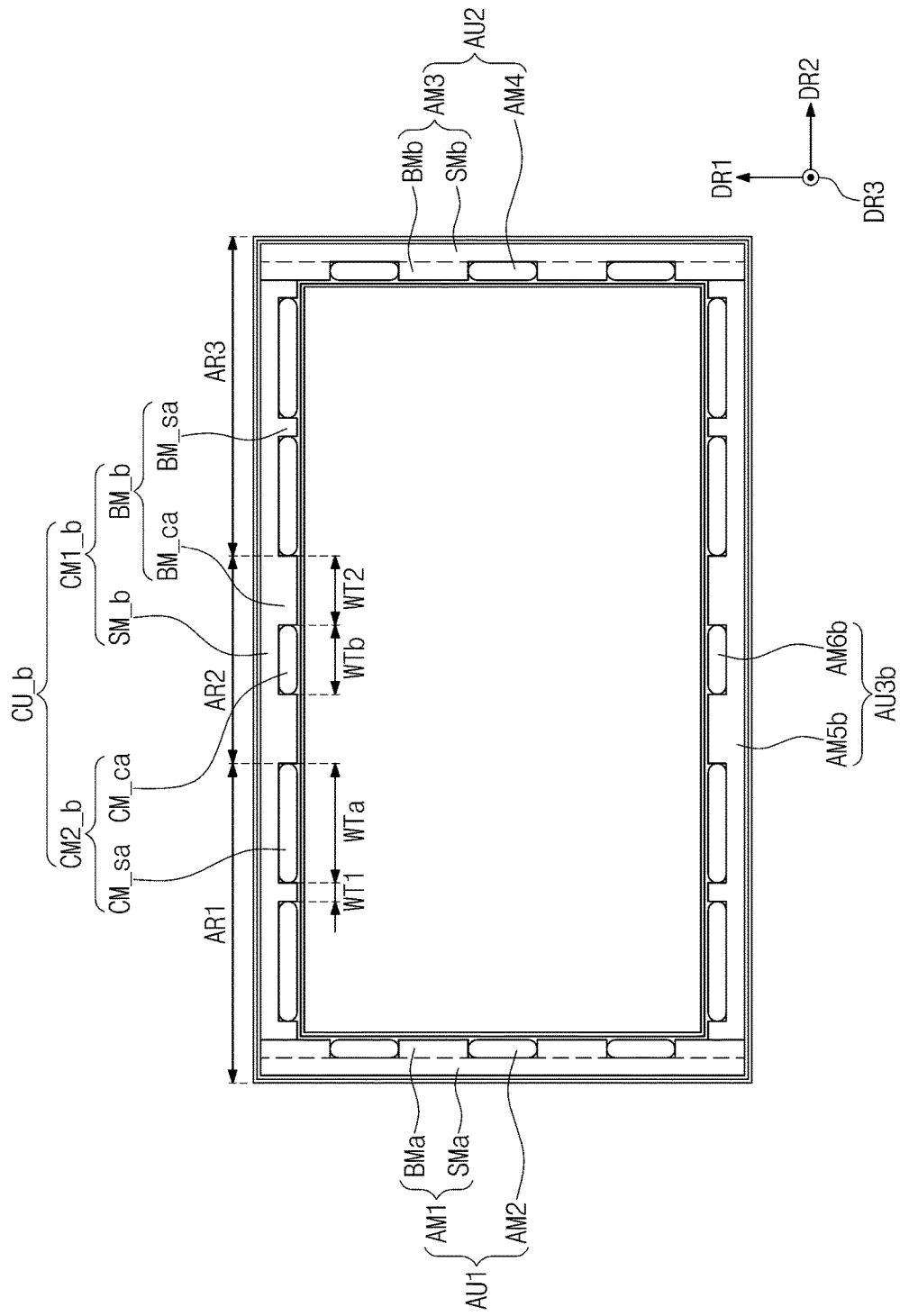
FIG. 10 is a plan view showing an exemplary embodiment of a part of components of a display device according to the invention.

FIG. 10 is a plan view showing a part of components of a display device according to an exemplary embodiment of the invention.

In the display device shown in FIG. 10, a coupling unit CU_b and a third adhesive unit AU3b are different from those of the display device shown in FIG. 9.

The coupling unit CU_b includes a first coupling member CM1_b and a second coupling member CM2_b. The first coupling member CM1_b includes a reference coupling part SM_b and branch coupling parts BM_b. The reference coupling part SM_b extends along the second direction DR2, and the branch coupling parts BM_b are protruded from the reference coupling part SM_b. The second coupling member CM2_b is disposed between two branch coupling parts adjacent to each other among the branch coupling parts BM_b.

The branch coupling parts BM_b include an outer branch coupling part BM_sa attached to the first and third areas AR1 and AR3 and a center branch coupling part BM_ca attached to the second area AR2. The second coupling member CM2_b includes an outer coupling member CM_sa attached to the first and third areas AR1 and AR3 and a center coupling part CM_ca attached to the second area AR2.

The outer coupling member CM_sa has a size greater than a size of the center coupling member CM_ca. The outer coupling member CM_sa has a first width WTa, and the center coupling member CM_ca has a second width WTb. The first and second widths WTa and WTb indicate a width in a direction parallel to the second direction DR2. The first width WTa is greater than a second width WTb. Accordingly, a density of the outer coupling member CM_sa arranged in the first and third areas AR1 and AR3 is higher than a density of the center coupling member CM_ca arranged in the second area AR2.

The third adhesive unit AU3b includes a fifth adhesive member AM5b and a sixth adhesive member AM6b. The fifth adhesive member AM5b is symmetrical with the first coupling member CM1_b with respect to a symmetrical axis extending in the second direction DR2.

FIGS. 9 and 10 show an example in which the first ratio of the outer coupling members CM_s and CM_sa is greater than the second ratio of the center coupling members CM_c and CM_ca. According to another exemplary embodiment, the outer coupling members CM_s and CM_sa and the center coupling members CM_c and CM_ca may be deformed in various ways such that the first ratio is greater than the second ratio. In an exemplary embodiment, the outer coupling member may be deformed to allow a width in the first direction DR1 of the outer coupling member to be greater than a width in the first direction DR1 of the center coupling member, for example. As another example, although the size of the outer coupling member is smaller than the size of the center coupling member, the outer coupling member may be more densely arranged than the center coupling member such that the first ratio is greater than the second ratio by allowing the width of the outer branch coupling part to be smaller than the width of the center branch coupling part.

Figure 11:
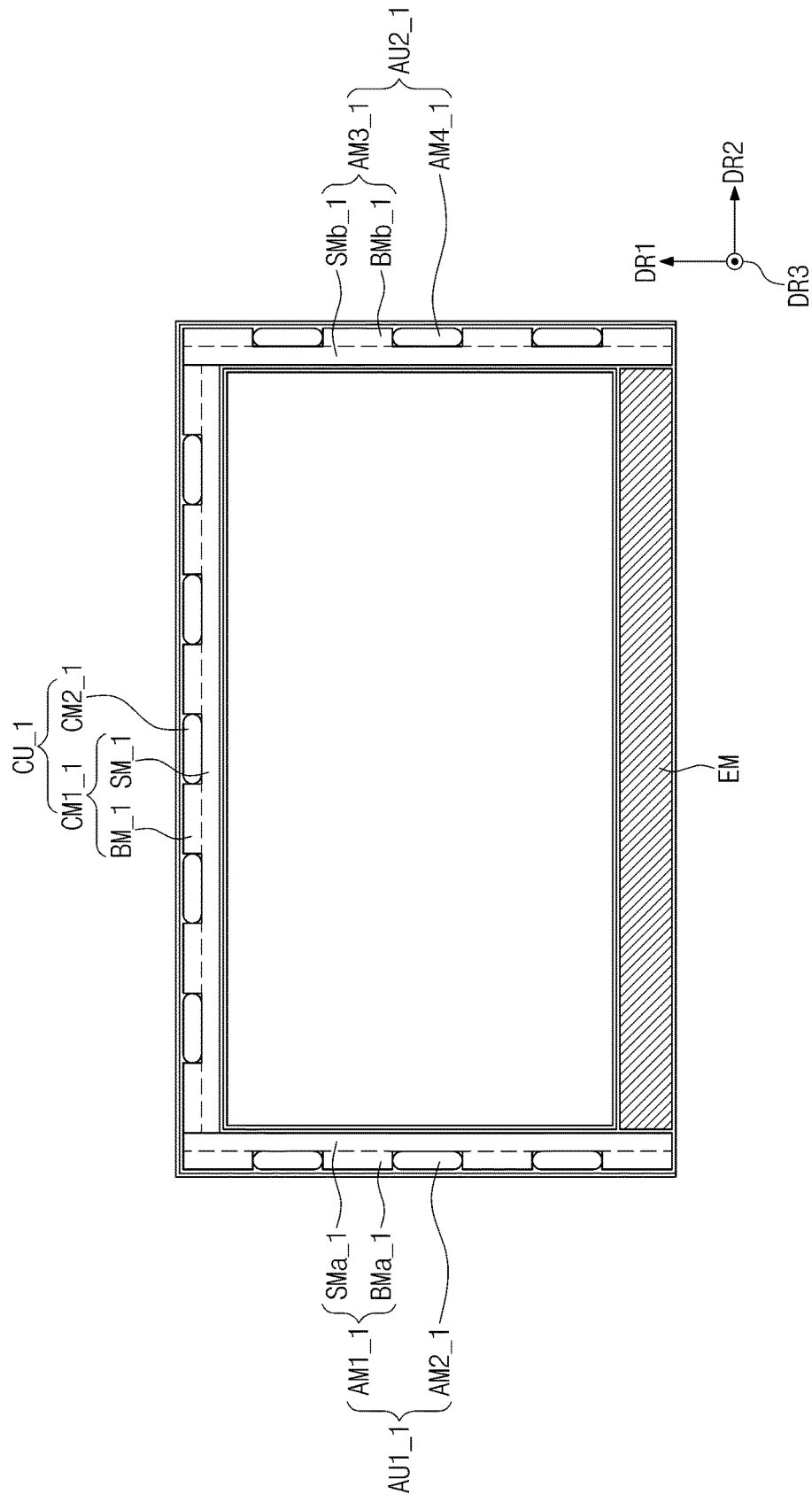
FIG. 11 is a plan view showing an exemplary embodiment of a part of components of a display device according to the invention.

FIG. 11 is a plan view showing a part of components of a display device according to an exemplary embodiment of the invention.

In the display device shown in FIG. 11, a coupling unit CU_1, a first adhesive unit AU1_1, and a second adhesive unit AU2_1 are different from those of the display device shown in FIG. 3.

Referring to FIGS. 2 and 11, the coupling unit CU_1 includes a first coupling member CM1_1 and a second coupling member CM2_1, the first adhesive unit AU1_1 includes a first adhesive member AM1_1 and a second adhesive member AM2_1, and the second adhesive unit AU2_1 includes a third adhesive member AM3_1 and a fourth adhesive member AM4_1.

The first coupling member CM1_1 includes a reference coupling part SM_1 and branch coupling parts BM_1. The reference coupling part SM_1 extends along the second direction DR2. The branch coupling parts BM_1 are protruded from the reference coupling part SM_1 to a direction parallel to the first direction DR1. The branch coupling parts BM_1 are protruded in a direction away from the display area DA. The reference coupling part SM_1 is disposed between the branch coupling parts BM_1 and the display area DA when viewed in a plan view. The second coupling member CM2_1 is disposed between two branch coupling parts adjacent to each other among the branch coupling parts BM_1.

The first adhesive member AM_1 includes a first reference adhesive part SMa_1 and first branch adhesive parts BMa_1, and the third adhesive member AM3_1 includes a second reference adhesive part SMb_1 and second branch adhesive parts BMb_1. Each of the first reference adhesive part SMa_1 and the second reference adhesive part SMb_1 extends along the first direction DR1. The first branch adhesive parts BMa_1 are protruded from the first reference adhesive part SMa_1 toward a direction away from the display area DA. The second branch adhesive parts BMb_1 are protruded from the second reference adhesive part SMb_1 toward a direction away from the display area DA. When viewed in a plan view, the first reference coupling part SMa_1 is disposed between the first branch coupling parts BMa_1 and the display area DA, and the second reference coupling part SMb_1 is disposed between the second branch coupling parts BMb_1 and the display area DA.

The second adhesive member AM2_1 is disposed between two first branch adhesive parts adjacent to each other among the first branch adhesive parts BMa_1, and the fourth adhesive member AM4_1 is disposed between two second branch adhesive parts adjacent to each other among the second branch adhesive parts BMb_1.

Figure 12:
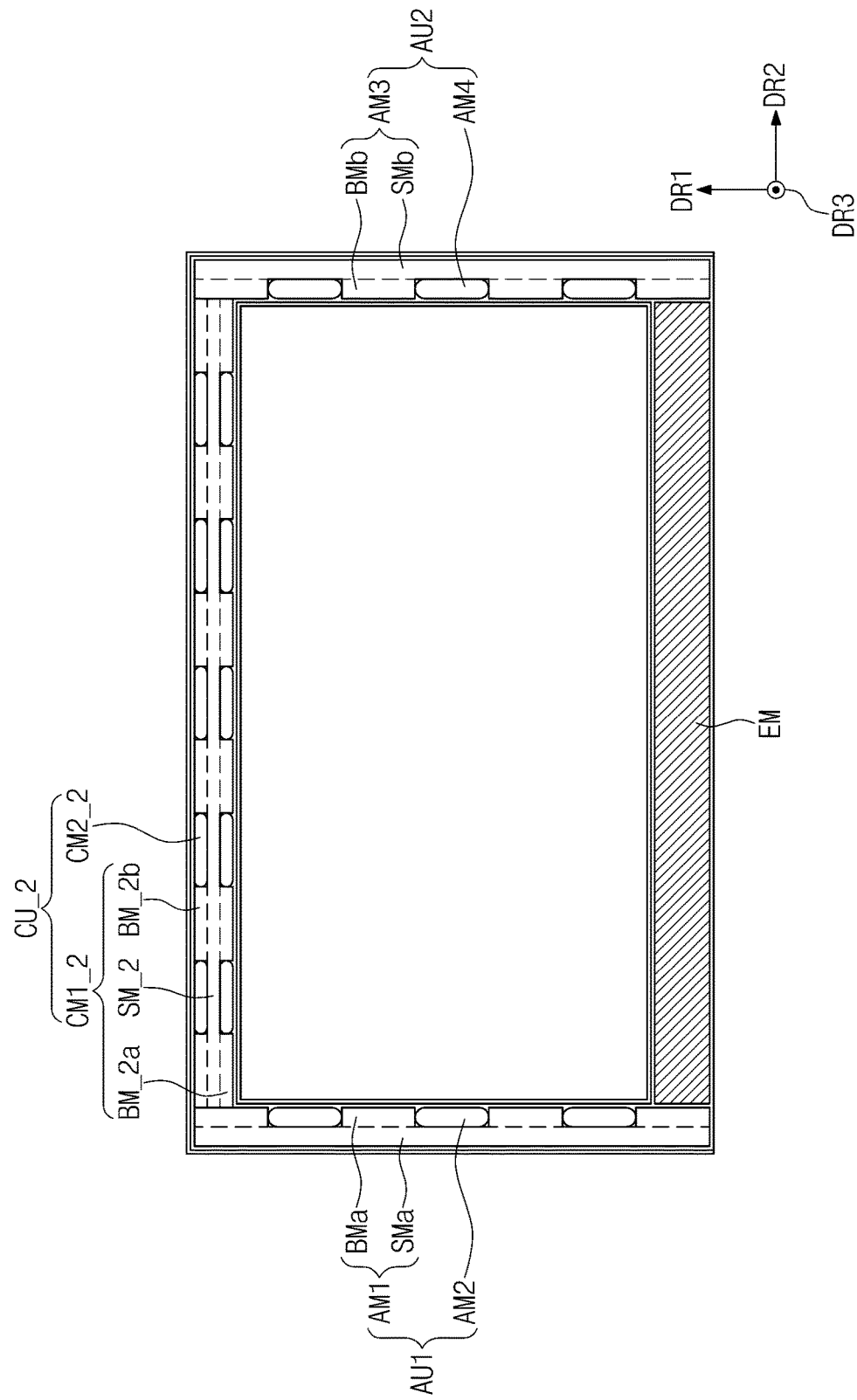
FIG. 12 is a plan view showing an exemplary embodiment of a part of components of a display device according to the invention.

FIG. 12 is a plan view showing a part of components of a display device according to an exemplary embodiment of the invention.

In the display device shown in FIG. 12, a coupling unit CU_2 is different from that of the display device shown in FIG. 3. Referring to FIG. 12, the coupling unit CU_2 includes a first coupling member CM1_2 and a second coupling member CM2_2.

The first coupling member CM1_2 includes a reference coupling part SM_2 and branch coupling parts BM_2a and BM_2b. The reference coupling part SM_2 extends in the second direction DR2. The branch coupling parts BM_2a and BM_2b are protruded from the reference coupling part SM_2 to a direction parallel to the first direction DR1. In more detail, the branch coupling parts BM_2a and BM_2b are protruded in opposite directions with respect to the reference coupling part SM_2. A first branch coupling parts BM_2a of the branch coupling parts BM_2a and BM_2b is protruded in a direction closer to the display area DA when viewed in a plan view, and a second branch coupling parts BM_2b of the branch coupling parts BM_2a and BM_2b is protruded in a direction away from the display area DA when viewed in a plan view.

Each of the first branch coupling parts BM_2a and each of the second branch coupling parts BM_2b have a symmetrical shape with respect to the reference coupling part SM_2 disposed between the first branch coupling parts BM_2a and the second branch coupling parts BM_2b. The second coupling member CM2_2 is disposed between two first branch coupling parts adjacent to each other among the first branch coupling parts BM_2a and between two second coupling parts adjacent to each other among the second branch coupling parts BM_2b.

The second coupling member CM2_2 is surrounded by two first coupling parts adjacent to each other and the reference coupling part SM_2 or surrounded by two second coupling parts adjacent to each other and the reference coupling part SM_2.

Figure 13:
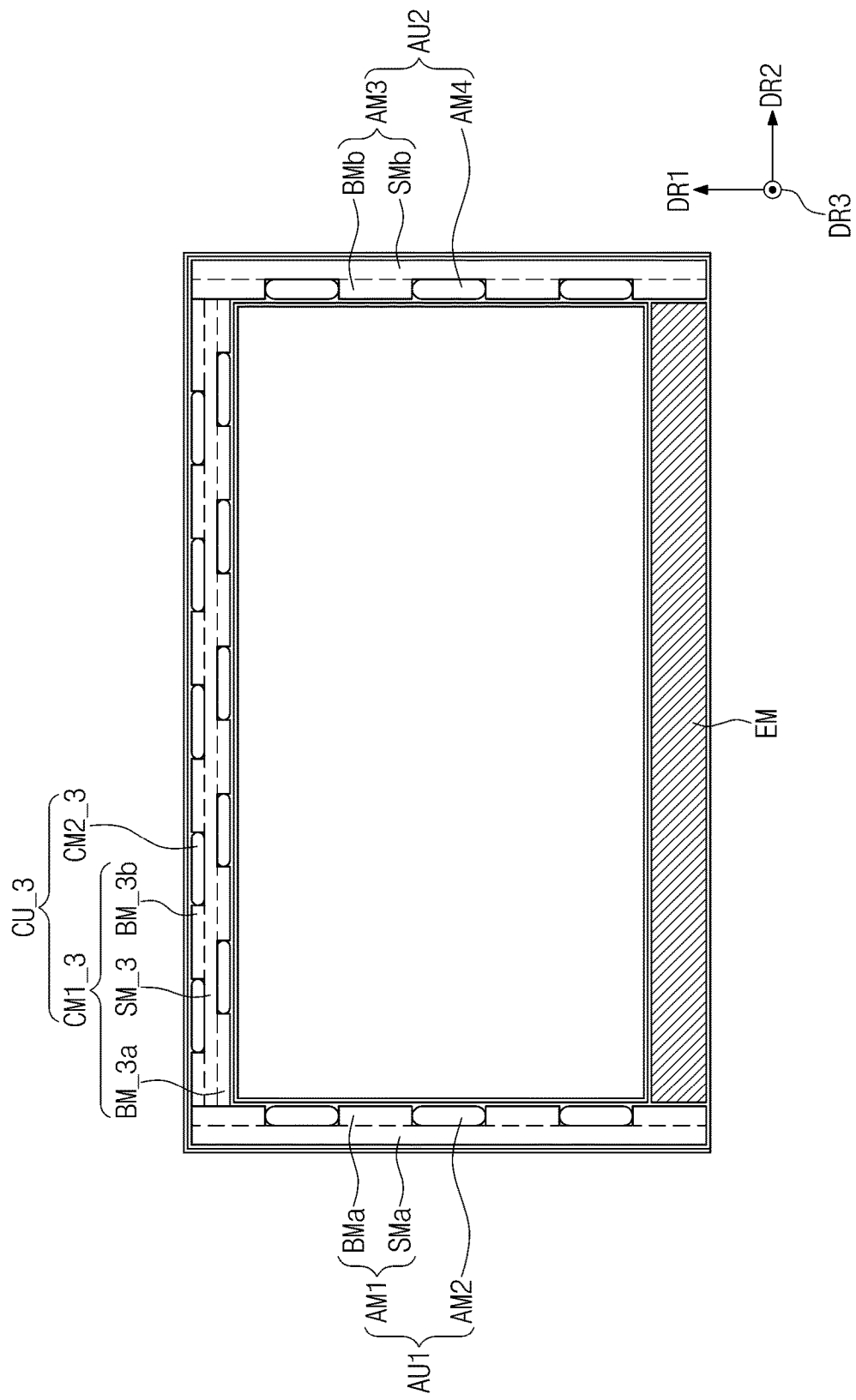
FIG. 13 is a plan view showing an exemplary embodiment of a part of components of a display device according to the invention.

FIG. 13 is a plan view showing a part of components of a display device according to an exemplary embodiment of the invention.

In the display device shown in FIG. 13, a coupling unit CU_3 is different from that of the display device shown in FIG. 12. Referring to FIG. 13, the coupling unit CU_3 includes a first coupling member CM1_3 and a second coupling member CM2_3.

The first coupling member CM1_3 includes a reference coupling part SM_3 and branch coupling parts BM_3a and BM_3b. The reference coupling part SM_3 extends in the second direction DR2. A first branch coupling parts BM_3a of the branch coupling parts BM_3a and BM_3b is protruded in a direction closer to the display area DA when viewed in a plan view, and a second branch coupling parts BM_3b of the branch coupling parts BM_3a and BM_3b is protruded in a direction away from the display area DA when viewed in a plan view.

Each of the first branch coupling parts BM_3a and each of the second branch coupling parts BM_3b are protruded from different positions of the reference coupling part SM_3 to be staggered from each other. Accordingly, the first branch coupling parts BM_3a are not symmetrical with the second branch coupling parts BM_3a even though the reference coupling part SM_3 is disposed between the first branch coupling parts BM_3a and the second branch coupling parts BM_3a.

In FIG. 13, the first branch coupling parts BM_3a partially overlap the second branch coupling parts BM_3b when viewed in the first direction DR1, but they should not be limited thereto or thereby. That is, the first branch coupling parts BM_3a face the second coupling member CM2_3 disposed between the second branch coupling parts BM_3b, and the second branch coupling parts BM_3b face the second coupling member CM2_3 disposed between the first branch coupling parts BM_3a.

Figure 14:
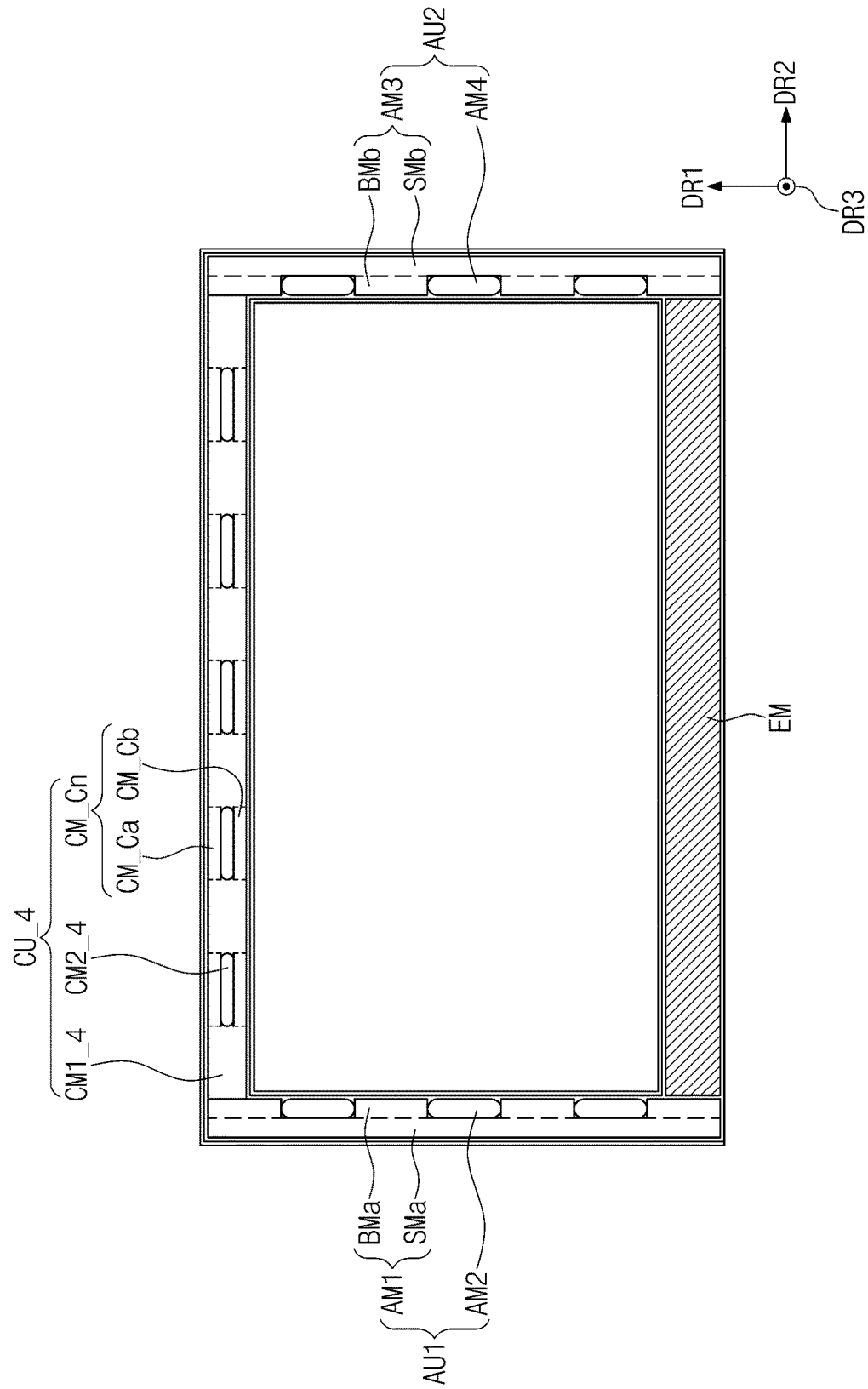
FIG. 14 is a plan view showing an exemplary embodiment of a part of components of a display device according to the invention.

FIG. 14 is a plan view showing a part of components of a display device according to an exemplary embodiment of the invention.

Referring to FIG. 14, a coupling unit CU_4 includes first coupling members CM1_4, a connection part CM_Cn, and a second coupling member CM2_4.

The first coupling members CM1_4 are arranged along the second direction DR2, and two first coupling parts adjacent to each other among the first coupling parts CM1_4 are spaced apart from each other in the second direction DR2. The connection part CM_Cn is disposed between the first coupling parts CM1_4 to connect two first coupling parts adjacent to each other. The second coupling member CM2_4 is disposed between the first coupling parts CM1_4. Accordingly, the connection part CM_Cn and the second coupling member CM2_4 are arranged in the first direction DR1 to be parallel to each other.

According to FIG. 14, the connection part CM_Cn includes a first connection part CM_Ca and a second connection part CM_Cb, and the first connection part CM_Ca and the second connection part CM_Cb are spaced apart from each other in the first direction DR1. The second coupling member CM2_4 is disposed between the first connection part CM_Ca and the second connection part CM_Cb. The second coupling member CM2_4 is surrounded by two coupling parts adjacent to each other among the first connection part CM_Ca, the second connection part CM_Cb, and the first coupling parts CM1_4.

The first coupling parts CM1_4 may unitary with or may be connected to the connection part CM_Cn. In an exemplary embodiment, the first coupling parts CM1_4 and the connection part CM_Cn may be a double-sided tape, and the second coupling member CM2_4 may be a curable resin, for example.

Figure 15:
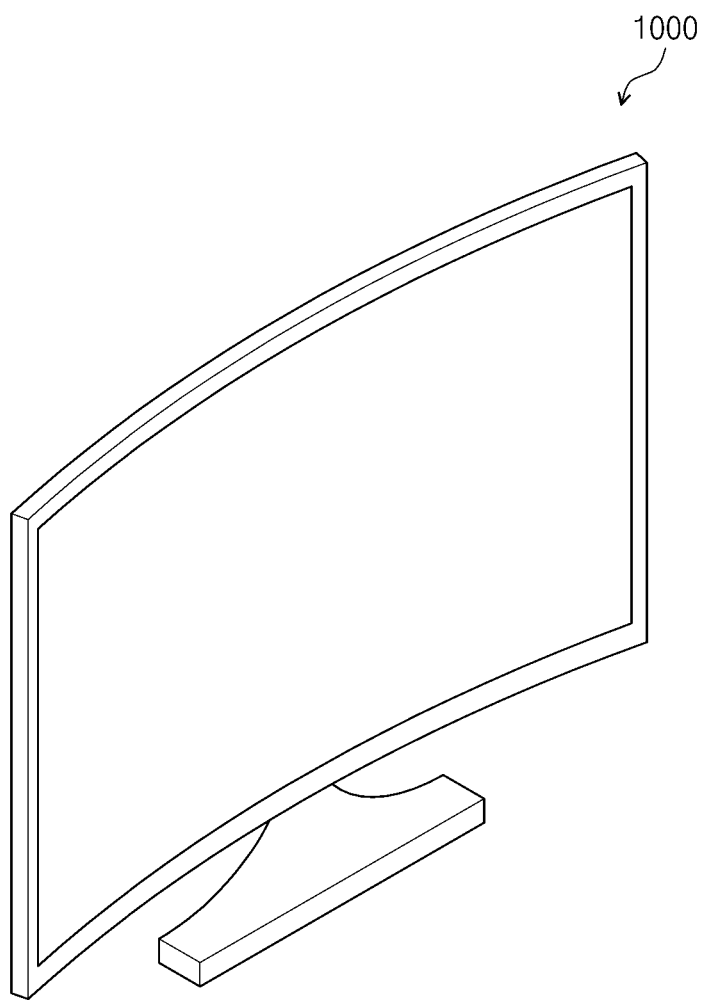
FIG. 15 is a perspective view showing an exemplary embodiment of a product to which a display device is applied according to the invention.

FIG. 15 is a perspective view showing a product to which a display device is applied according to an exemplary embodiment of the invention.

FIGS. 2 and 15 show a stand type multimedia device 1000 as a representative example, but it should not be limited thereto or thereby. In an exemplary embodiment, the multimedia device 1000 may be deformed in a wall-mounted type, built-in type, or hand-held type multimedia device, for example. The display devices according to various exemplary embodiments described with reference to FIGS. 1 to 14 may be applied to the multimedia device 1000.

The display device DD described with reference to FIGS. 1 to 14 couples the display panel DP and the middle frame MF using the coupling unit including the first coupling members CM1, CM1_a, CM1_b, CM1_1, CM1_2, CM1_3, and CM1_4 and the second coupling members CM2, CM2_a, CM2_b, CM2_1, CM2_2, CM2_3, and CM2_4. Accordingly, since the first coupling members CM1, CM1_a, CM1_b, CM1_1, CM1_2, CM1_3, and CM1_4 fix the display panel DP and the middle frame MF to each other, the distance between the display panel DP and the middle frame MF may be easily maintained during the curing of the second coupling members CM2, CM2_a, CM2_b, CM2_1, CM2_2, CM2_3, and CM2_4. Since the cured second coupling members CM2, CM2_a, CM2_b, CM2_1, CM2_2, CM2_3, and CM2_4 have the adhesive strength stronger than that of the first coupling members CM1, CM1_a, CM1_b, CM1_1, CM1_2, CM1_3, and CM1_4, the phenomenon in which the display panel DP is separated from the middle frame MF due to the restoring force of the curved display panel DP may be reduced. In addition, since the second coupling members CM2, CM2_a, CM2_b, CM2_1, CM2_2, CM2_3, and CM2_4 have the elasticity, the phenomenon in which the display panel DP is separated from the middle frame MF may be reduced even though the shearing stress is applied to the coupling unit during the evaluation of the thermal impact reliability. Therefore, in the case where the display device DD according to various exemplary embodiments of the invention is applied to the multimedia device 1000, a frameless curved display device may be stably realized.

In the above-mentioned various exemplary embodiments, the coupling units CU, CU_a, CU_b, CU_1, CU_2, CU_3, and CU_4, the first adhesive units AU1, AUa, and AU1_1, the second adhesive units AU2, AUb, and AU2_1, the third adhesive units AU3, AU3a, and AU3b, and the elastic member EM may be selectively combined with each other in various ways to fix the display panel DP and the middle frame MF. Accordingly, the combination of components of the display device should not be limited thereto or thereby.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising: a display panel comprising a display area and a non-display area surrounding the display area; a middle frame supporting the non-display area; and a coupling unit which is disposed between an area extending in a predetermined direction of the non-display area and the middle frame and couples the display panel and the middle frame, the coupling unit comprising: a first coupling member comprising a reference coupling part extending in the predetermined direction and a plurality of branch coupling parts protruded from the reference coupling part; and a second coupling member is surrounded by a portion of the reference coupling part and two branch coupling parts adjacent to each other among the plurality of branch coupling parts; and the first coupling member is a double-sided tape, and the second coupling member is a curable resin.

2. The display device of claim 1, wherein the plurality of branch coupling parts and the second coupling member are disposed between the reference coupling part and the display area when viewed in a plan view.

3. The display device of claim 1, wherein the non-display area comprises:
    a first non-display area extending along a first direction;
    a second non-display area facing the first non-display area such that the display area is disposed between the first and second non-display areas;
    a third non-display area extending along a second direction different from the first direction; and
    a fourth non-display area facing the third non-display area such that the display area is disposed between the third and fourth non-display areas, and the coupling unit is disposed between the third non-display area and the middle frame.

4. The display device of claim 3, further comprising a support unit disposed between at least one of the first, second, and fourth non-display areas and the middle frame.

5. The display device of claim 4, further comprising a top chassis covering the fourth non-display area when viewed in a plan view and being coupled to the middle frame.

6. The display apparatus of claim 5, wherein the support unit comprises an elastic member disposed between the fourth non-display area and the middle frame.

7. The display device of claim 4, wherein the support unit comprises:
    a first adhesive unit disposed between the first non-display area and the middle frame; and
    a second adhesive unit disposed between the second non-display area and the middle frame.

8. The display device of claim 7, wherein the first adhesive unit comprises:
    a first adhesive member comprising a first reference adhesive part extending in the first direction and a plurality of first branch adhesive parts protruded in the second direction from the first reference adhesive part; and
    a second adhesive member disposed between two first branch adhesive parts adjacent to each other among the plurality of first branch adhesive parts, and the second adhesive unit comprises:
    a third adhesive member comprising a second reference adhesive part extending in the first direction and a plurality of second branch adhesive parts protruded in the second direction from the second reference adhesive part; and
    a fourth adhesive member disposed between two second branch adhesive parts adjacent to each other among the plurality of second branch adhesive parts.

9. The display device of claim 7, wherein each of the first and second adhesive units comprises a same material as that of one of the first coupling member and the second coupling member, and each of the first and second adhesive units extends along the first direction.

10. The display device of claim 7, wherein the support unit further comprises a third adhesive unit disposed between the fourth non-display area and the middle frame.

11. The display device of claim 10, wherein the third adhesive unit comprises:
    a first adhesive member comprising a reference adhesive part extending along the second direction and a plurality of branch adhesive parts protruded in the first direction from the reference adhesive part; and
    a second adhesive part disposed between two branch adhesive parts adjacent to each other among the plurality of branch adhesive parts.

12. The display device of claim 10, wherein the third adhesive unit comprises a same material as that of one of the first coupling member and the second coupling member, and the third adhesive unit extends along the second direction.

13. The display device of claim 3, wherein the display panel is curved as viewed relative to a reference axis parallel to the first direction with respect to a plane defined by the first direction and the second direction.

14. The display device of claim 13, wherein the third non-display area comprises a first area, a second area, and a third area sequentially arranged in the second direction, the second coupling member is provided in a plural number and comprises outer coupling members attached to the first and third areas and a center coupling member attached to the second area, the plurality of branch coupling parts comprises outer branch coupling members attached to the first and third areas and a center branch coupling member attached to the second area, a ratio of an area of the outer coupling members to an area of the first and third areas corresponds to a first ratio when viewed in a plan view, and a ratio of an area of the center coupling member to an area of the second area corresponds to a second ratio smaller than the first ratio when viewed in the plan view.

15. The display device of claim 14, wherein each of the outer coupling members has a first width, the center coupling member has a second width smaller than the first width, and the first and second widths are measured in a direction parallel to the second direction.

16. The display device of claim 14, wherein each of the outer branch coupling members has a first width, the center branch coupling member has a second width smaller than the first width, and the first and second widths are measured in a direction parallel to the second direction.

17. The display device of claim 1, wherein the reference coupling part is disposed between the display area and the plurality of branch coupling parts when viewed in a plan view.

18. The display device of claim 1, wherein the first coupling member further comprises:
    a first adhesive layer attached to the display panel;
    a second adhesive layer attached to the middle frame; and
    a polymer resin layer disposed between the first adhesive layer and the second adhesive layer.

19. The display device of claim 18, wherein the first coupling member further comprises a film layer disposed between the second adhesive layer and the polymer resin layer.

20. A display device comprising: a display panel having a curved shape; a middle frame disposed under the display panel and having a curved shape corresponding to the curved shape of the display panel; a first coupling member comprising a reference coupling part disposed between the display panel and the middle frame and extending in a predetermined direction and a plurality of branch coupling parts protruded from the reference coupling part to a direction different from the predetermined direction in which the reference coupling part extends; and a second coupling member disposed between the display panel and the middle frame and is surrounded by a portion of the reference coupling part and two branch coupling parts adjacent to each other among the plurality of branch coupling parts; and the first coupling member is a double-sided tape, and the second coupling member is a curable resin.

21. The display device of claim 20, wherein the display panel is curved in a first direction as viewed relative to a reference axis parallel to a second direction with respect to a plane defined by the second direction and a first direction, the middle frame comprises:
    a first supporter which extends parallel to the second direction and supports the display panel;
    a second supporter facing the first supporter, supporting the display panel, and spaced apart from the first supporter in the first direction;
    a third supporter which extends parallel to the first direction and supports the display panel; and
    a fourth supporter facing the third supporter, supporting the display panel, and spaced apart from the third supporter in the second direction, the first coupling member is provided in a plural number, and the first coupling members are disposed between the first supporter and the display panel, between the second supporter and the display panel, and between the third supporter and the display panel.

22. The display device of claim 21, further comprising:
    an elastic member disposed between the fourth supporter and the display panel; and
    a top chassis covering an area of the display panel which overlaps the fourth supporter when viewed in a plan view and being coupled to the middle frame.

23. A display device comprising: a display panel; a middle frame disposed under the display panel; and a coupling unit which is disposed between the middle frame and the display panel and couples the middle frame and the display panel, the coupling unit comprising: first coupling parts; at least one connection part which is disposed between the first coupling parts and connects two first coupling parts adjacent to each other; and a second coupling part disposed between two first coupling parts adjacent to each other, wherein the second coupling part is surrounded by the two first coupling parts adjacent to each other and the at least one connection part; and the first coupling parts and the at least one connection part are a double-sided tape, and the second coupling part is a curable resin.

* * * * *